UNITED STATES PATENT OFFICE.

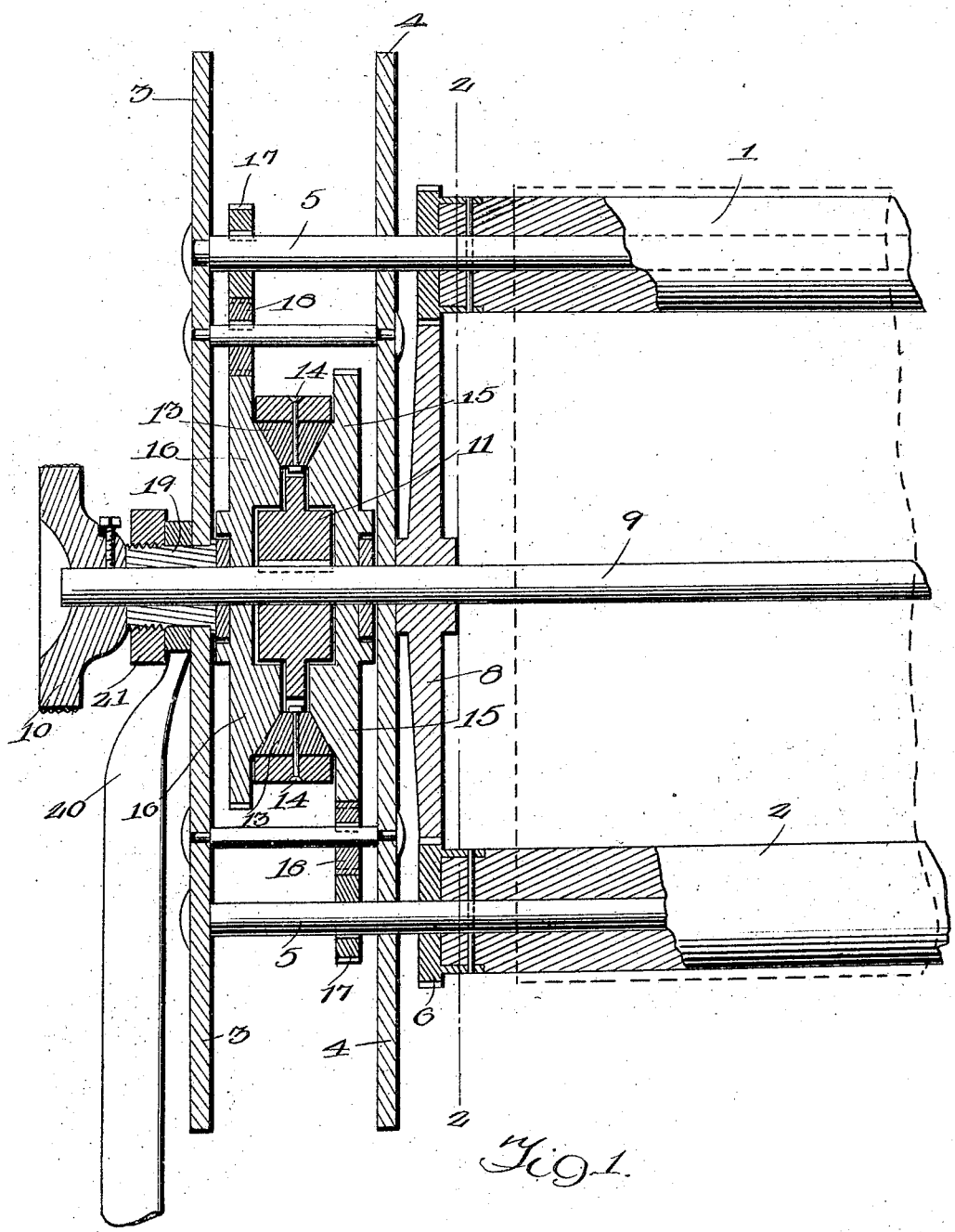

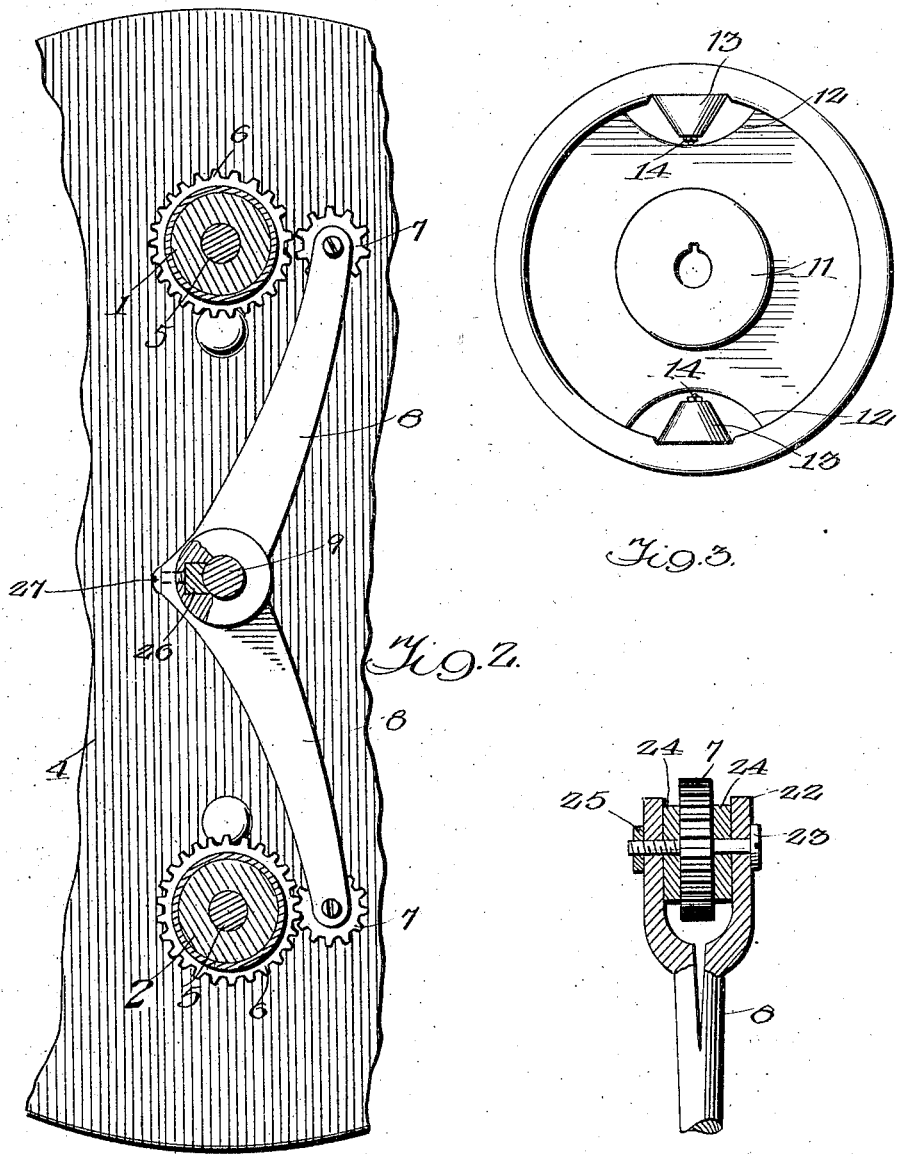

GEORGE ORIE GRAY, OF BUTTE, MONTANA.

COMPENSATING DEVICE.

1,404,846.　　　　Specification of Letters Patent.　　Patented Jan. 31, 1922.

Application filed December 3, 1920. Serial No. 428,143.

*To all whom it may concern:*

Be it known that I, GEORGE O. GRAY, a citizen of the United States, and a resident of Butte, in the county of Silverbow and State of Montana, have invented certain new and useful Improvements in Compensating Devices, of which the following is a specification.

My invention is an improvement in compensating devices, and has for its object to provide a device of the character specified, especially adapted for use with chart display apparatus, for compensating for difference in speed due to the unequal size of the rollers while the chart is winding from one and winding on the other.

In the drawings:

Figure 1 is a horizontal section,

Figure 2 is a section on the line 2—2 of Figure 1,

Figure 3 is a side view of the pinion support,

Figure 4 is a section through one of the friction gears.

In the present embodiment of the invention, the chart rollers indicated at 1 and 2 are journaled in a suitable case 3 which has at one end a partition 4 forming a chamber for the compensating mechanism between the said partition and the adjacent end of the casing. Each of the rollers 1 and 2 has a shaft 5, and each roller carries a pinion 6 at the end adjacent to the partition.

These pinions 6 are adapted to be engaged by pinions 7 on the end of a cross head 8 which is frictionally held to the driving shaft 9 for the chart rollers. This shaft 9 extends through the end of the casing 3, and is provided with a knurled knob 10 for convenience in turning the same. The cross head is so arranged that but one of the pinions 7 may be engaged with a pinion 6, the other pinion being moved out of engagement when one pinion is moved into engagement.

When the shaft 9 is turned in either direction, the cross head 8 will be swung to cause a pinion 7 to engage that chart roller 1 or 2 as the case may be from which the chart is unwinding, and to brake the movement of the roller.

The chart rollers are driven from the shaft 9, by means of mechanism shown between the end of the casing and the partition 4 in Figure 1. This mechanism comprises a hub 11 which is keyed to the shaft 9, and which carries in recesses 12 near its periphery conical pinions 13, the said pinions being journaled on axes indicated at 14 and radial to the shaft 9.

The pinions 13 engage annular series of bevel gear teeth on disks 15 and 16 which are journaled on the shaft 9 on opposite sides of the hub 11. The respective gear wheels 15 and 16 drive the shafts of the rollers 1 and 2 through pinions 17 on the shafts of the rollers 1 and 2, and idlers 18 interposed between the shafts 17 and the gear wheels 15 and 16.

A sleeve or bushing 19 is arranged between the shaft 9 and the end of the casing, and this bushing is engaged by a bearing on a bracket 20. A nut 21 is threaded onto the bushing outside of the baring, to prevent disengagement of the bracket.

In operation, when it is desired to move the chart in either direction, the knob 10 is turned. If the knob is turned in a direction to wind the chart on the roller 1, that is, to move the chart upward in Figure 1, the friction brake will be applied to the chart 2, and the chart 1 will rotate freely, while the chart roller 2 will be braked or retarded.

The gear wheels 15 and 16 are held frictionally on the shaft 9, so that when a roller 1 or 2 is braked, the gear wheel corresponding thereto may slip on the shaft 9. Thus there will be compensation for the difference in speed of the rollers due to the variation in size.

The cross head is not only frictionally held on the shaft 9, but the pinions 7 are frictionally mounted on the cross head. As shown in Figure 4, each of these pinions is mounted between the arms 22 of a fork on the end of the cross head, and the arms are resilient so that they may move toward and from each other to clamp upon or loosen the pinion.

A screw 23 passes through the arm and through the pinion and through washers 24 on each side of the pinion, and is engaged by a nut 25 on the outer side of one arm. By turning the nut friction may be increased or diminished.

It will be noticed that the frictional connection between the shaft 9 and the cross head is by means of a block 26, which is arranged within the bearing of the cross head, and it may be pressed against the shaft with more or less friction, by means of a set screw 27.

I claim:

1. In combination with chart supporting rollers, of a common operating means for turning the said rollers to wind the chart on one and to unwind the chart from the other, compensating mechanism arranged between the operating means and the rollers for permitting a differential movement between said rollers, said compensating mechanism comprising a differential connection between the rollers, and a brake for one roller controlled to engage the roller from which the chart is unwinding by the movement of the operating means, said braking means comprising a cross head connected with the operating means to swing toward one roller and away from the other, said rollers having gear wheels and the ends of the cross head having pinions adapted for meshing with said gear wheels, said pinions being frictionally connected with the cross head.

2. The combination with a pair of rollers, of an operating shaft therefor, a driving member rigidly secured on said shaft and having pinions, gear wheels on opposite sides of said driving member and engaged by said pinions, and means operatively connecting said gear wheels and said rollers.

3. The combination with a pair of rollers, of an operating shaft therefor, a driving member rigidly secured on said shaft and having pinions, gear wheels on opposite sides of said driving member and engaged by said pinions, means operatively connecting said gear wheels and said rollers, and braking means mounted on and operated by said shaft.

4. The combination with a pair of rollers, of an operating shaft therefor, a driving member keyed on said shaft, gear wheels frictionally mounted on said shaft on opposite sides of said driving member, means operatively connecting said driving member and said gear wheels, and gears connected to said rollers and meshing with said gear wheels, a display strip connected to said rollers, and braking means mounted on said operating shaft and a friction member engaging the shaft.

GEORGE ORIE GRAY.